United States Patent
Gautama

(10) Patent No.: US 9,172,479 B2
(45) Date of Patent: Oct. 27, 2015

(54) PROCESSOR FOR AN FM SIGNAL RECEIVER AND PROCESSING METHOD

(71) Applicant: NXP B.V., Eindhoven (NL)

(72) Inventor: Temujin Gautama, Boutersem (BE)

(73) Assignee: NXP, B.V., Eindhoven (NL)

( * ) Notice: Subject to any disclaimer, the term of this patent is extended or adjusted under 35 U.S.C. 154(b) by 353 days.

(21) Appl. No.: 13/736,363

(22) Filed: Jan. 8, 2013

(65) Prior Publication Data

US 2013/0182851 A1    Jul. 18, 2013

(30) Foreign Application Priority Data

Jan. 16, 2012    (EP) .................................... 12151208

(51) Int. Cl.
| | |
|---|---|
| H04H 20/48 | (2008.01) |
| H04H 20/89 | (2008.01) |
| H04B 1/16 | (2006.01) |
| H04H 40/72 | (2008.01) |
| H04B 15/00 | (2006.01) |

(52) U.S. Cl.
CPC ............ *H04H 20/89* (2013.01); *H04B 1/1676* (2013.01); *H04H 40/72* (2013.01)

(58) Field of Classification Search
USPC ................. 381/3, 17, 80, 94.1, 94.3
See application file for complete search history.

(56) References Cited

U.S. PATENT DOCUMENTS

| | | | |
|---|---|---|---|
| 5,140,704 A | 8/1992 | Ueno | |
| 5,253,299 A * | 10/1993 | Ishida et al. | .................... 381/13 |
| 5,982,901 A | 11/1999 | Kane et al. | |
| 6,549,586 B2 | 4/2003 | Gustafsson et al. | |
| 7,110,549 B2 | 9/2006 | Wildhagen | |
| 7,715,567 B2 | 5/2010 | Wildhagen | |
| 7,783,481 B2 | 8/2010 | Endo et al. | |
| 8,155,302 B2 | 4/2012 | Roovers | |
| 8,756,055 B2 | 6/2014 | Eriksson et al. | |
| 2011/0235809 A1 * | 9/2011 | Schuijers et al. | ............... 381/17 |

FOREIGN PATENT DOCUMENTS

| | | |
|---|---|---|
| CN | 1101182 A | 4/1995 |
| CN | 1356014 A | 6/2002 |
| CN | 1624767 A | 6/2005 |
| CN | 101366265 A | 2/2009 |
| CN | 203346230 A | 11/2011 |
| EP | 0 955 732 A1 | 11/1999 |
| EP | 1 061 654 A1 | 12/2000 |
| WO | 2008/087577 A1 | 7/2008 |

OTHER PUBLICATIONS

Office Action from counterpart application CN 201310012689.5 (Jul. 22, 2014).
Loizou, P. "Speech Enhancement: Theory and Practice," chapter 5, "Spectral-Subtractive Algorithms", CRC Press, 1st ed., pp. 97-141 (2007).
Extended European Search Report for European Patent Appln. No. 12151208.1 (Jul. 4, 2012).
Office Action from counterpart application CN 201310012689.5 (Dec. 18, 2014).

* cited by examiner

*Primary Examiner* — Paul S Kim
*Assistant Examiner* — Norman Yu

(57) ABSTRACT

A processing unit for processing a multi-channel audio signal has a delay element (40) for delaying an FM sum signal (sum) and a converter arrangement (T) for converting an FM difference signal (diff) and a noise signal (diffnoise) to the frequency domain. Frequency-based noise suppression is used to derive a de-noised frequency-domain difference signal using a gain function which is limited to a maximal and a minimal value. This is then converted to the time domain, and the first and second audio signals are calculated from a delayed sum signal (sum2) and the de-noised time domain difference signal (diff2).

13 Claims, 3 Drawing Sheets

US 9,172,479 B2

PROCESSOR FOR AN FM SIGNAL RECEIVER AND PROCESSING METHOD

CROSS-REFERENCE TO RELATED APPLICATIONS

This application claims the priority under 35 U.S.C. §119 of European patent application no. 12151208.1, filed on Jan. 16, 2012, the contents of which are incorporated by reference herein.

SUMMARY OF THE INVENTION

This invention relates to an FM signal receiver and reception method.

In FM broadcasting, the demodulated FM-stereo signal consists of a mono audio signal in the form of a sum signal (L+R, "main" channel), transmitted as baseband audio in the range of 30 Hz to 15 kHz, a pilot tone of 19 kHz and a stereo difference signal (L-R, "Sub" channel) amplitude modulated on a 38 kHz sub carrier, occupying the range of 24 kHz to 53 kHz.

The representation of a stereo audio signal as a sum and a difference signal, rather than a left and a right audio signal, ensures compatibility with mono receivers, which only use the main channel.

FIG. 1 is a schematic diagram of an FM tuner, which converts an FM radio broadcast into audio signals. The tuner generates three output signals from a given FM broadcast: the sum signal ("sum"), the difference signal ("diff") and a signal that is representative of the noise that is present in the difference signal ("diffnoise"). The diffnoise signal is a signal with signal statistics that are similar to the noise component present in the difference signal.

The noise information can for example be derived from the difference signal diff. FIG. 2a is a schematic representation of the Power Spectral Density (PSD) of an input FM multiplex signal. The input signal comprises a baseband sum signal 21 (between 0 and 15 kHz), a 19 kHz pilot tone 22 and a double sideband suppressed carrier modulated difference signal 23 (between 23 and 53 kHz). A noise signal 24 is also present, which tends to increase with increasing frequency.

The difference signal 23 is effectively available twice, once in the frequency range from 23 to 38 kHz and once in the frequency range from 38 to 53 kHz. Hence, using this knowledge the received difference signal, which consists of the original difference signal plus the additional noise component is obtained, but an approximation of the noise signal diffnoise can also be derived.

The two signals can be obtained as illustrated in FIGS. 2b and 2c. Quadrature modulation (modulation with complex-exponential) is first applied to the original input spectrum of FIG. 2a with a modulation frequency of 38 kHz. This results in a complex valued signal having the spectrum indicated in FIG. 2b. This signal is then low pass filtered to approximately 15 kHz, resulting in the signal shown in FIG. 2c (the band pass filter is indicated by the band pass function 27). The resulting complex valued signal comprises the demodulated received signal diff as well as the complex-modulated signal diffnoise. By taking the real part and imaginary part of this signal, the total received difference signal (i.e. including the received noise) and the noise signal diffnoise can be obtained.

The difference signal is real-valued, leading to a symmetrical spectrum. The noise does not have a symmetrical spectrum (due to demodulation). The part of the total spectrum that is symmetrical ends up in the real-valued part of the signal, and the complex-valued part contains much of the noise, although part of the noise will also end up in the real-valued part.

As a consequence, a ratio of the signal plus noise to the noise (SNNR) of the difference signal can be estimated. The power of the difference signal consists of the power of the difference signal plus the power of the noise estimate, under the assumption that there is zero correlation between the difference signal and the positive and negative noise components.

Referring back to FIG. 1, the left and right audio signals are reconstructed from the sum and difference signals by, respectively adding and subtracting the sum and difference signals (possibly with a scaling factor). This process is often referred to as dematrixing (labeled "DM" in FIG. 1).

When the reception quality of the FM tuner deteriorates, noise degrades the FM signal. However, the sum and difference signals are influenced differently.

When the received FM signal contains white noise, the corresponding demodulated noise component linearly increases with frequency. Since the Main channel signal is present in the low frequency area (up to 15 kHz), the signal-to-noise ratio (SNR) is considerably better in the sum signal than in the difference signal.

This means that in noisy conditions, the mono signal (only the sum signal) contains less noise than the stereo signal (since the left and right signals are derived from the sum and the difference signal). There exist approaches that exploit the fact that the sum signal is less affected by the noise than the difference signal, by switching from a stereo to a mono signal depending on the FM reception quality or other measures related to the expected SNR of the difference signal, e.g., using the signal power of the diffnoise signal.

In EP 0 955 732, an approach for de-noising the difference signal is described which divides the difference signal into sub-band signals, which are individually multiplied with factors to generate a frequency selective weighted stereo difference signal. The factors can be set as a function of the signal quality of the RF-signal, the signal energy in the sum signal or the signal energy in the difference signal. A further extension is described in U.S. Pat. No. 7,110,549 which takes into account perceptual masking effects in the computation of the weighting factors.

A different approach is disclosed in US2011/0235809. A difference signal is synthesised as a weighted sum of the original difference signal and a de-correlated version of the sum signal (also per sub-band). The weighting factors depend on the cross-correlation between sum and difference signals, and the powers of the sum and difference signals.

In WO 2008/087577, a portion of the sum signal is added to the synthesised difference signal.

According to the invention, there is provided a processing unit and a method as defined in the independent claims.

In one aspect, the invention provides a processing unit for processing a multi-channel audio signal comprising:

a delay element for delaying an FM sum signal (sum) representing a sum of a first and a second audio signal;

a converter arrangement for converting an FM difference signal (diff) representing a difference between the first and second audio signals to the frequency domain, and for converting a noise signal (diffnoise) representing noise in the FM difference signal to the frequency domain;

a frequency-based noise suppression unit for suppressing noise in the difference signal (diff) to derive a de-noised frequency-domain difference signal on the basis of a gain function based at least on the frequency-domain noise signal amplitude, wherein the gain function is limited to a maximal and a minimal value;

an inverse transform unit for inversely transforming the de-noised difference signal or a signal derived from it to the time domain; and a de-matrixing unit for computing the first and second audio signals from the delayed sum signal and time domain difference signal.

The invention applies a frequency-domain noise suppression technique to the difference signal, before it is recombined with the sum signal. The enhanced (de-noised) difference signal is mixed with the sum signal and this masks many of the problems (artifacts) that would be audible when listening to the difference signal only.

In a preferred example, a gain unit is provided for applying additional gain factors to the de-noised frequency-domain difference signal to derive a processed frequency-domain difference signal, and the inverse transform unit is for inversely transforming the processed frequency-domain difference signal.

In this way, the frequency-domain de-noising is combined with adaptive gain factors to ensure that the noise level in the output signal is sufficiently low. The gain factors can adapt slowly over time in response to noise changes.

Traditional frequency-domain noise suppression algorithms compute a gain function that is a function of the amplitude spectra of the original signal and of an estimated disturbance. In this case, the original signal is the difference signal (diff) and the disturbance is the noise signal (diffnoise). This diffnoise signal is either available from the FM tuner as outlined above or it can be estimated using techniques that are well known (such as noise floor estimation).

To avoid typical frequency-domain noise suppression artifacts, such as musical noise, the amount of noise suppression is limited. The adaptive gain factors are controlled in such a way that the combination of the noise suppression and the adaptive gain factors yield an audio signal in which the noise level is sufficiently low.

The processing unit preferably comprises a controller for controlling the gain unit. The adaptive gain factors can be based on a residual noise level. The converter arrangement can also be used for converting the sum signal to the frequency domain, and the adaptive gain factors then can be based on a residual noise level in combination with the frequency-domain sum signal.

The gain function and adaptive gain factors can be controlled such that the expected signal-to-noise ratio in the first and second audio signals meet predefined criteria. The criteria can be based on the ratio of the expected peak value in the first audio signal, the second audio signal or the sum signal, and the noise level in the processed difference signal.

The invention also provides a receiver comprising an FM tuner and a processing unit of the invention.

Another aspect of the invention provides a method of processing a multi-channel audio signal comprising:

delaying an FM sum signal (sum) representing a sum of a first and a second audio signal;

converting an FM difference signal (diff) representing a difference between the first and second audio signals to the frequency domain, and converting a noise signal (diffnoise) representing noise in the FM difference signal to the frequency domain;

suppressing noise in the frequency-domain difference signal using a frequency-based noise suppression unit to derive a de-noised difference signal on the basis of a gain function based on at least the frequency-domain noise signal amplitude, wherein the gain function is limited to a maximal and a minimal value, inversely transforming the de-noised frequency-domain difference signal or a signal derived from it to the time domain; and computing the first and second audio signals from the delayed sum signal (sum2) and time domain difference signal.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a processing unit for processing a multi-channel audio signal in which frequency-based noise suppression is applied to the difference signal. This de-noising can be combined with adaptive gain factors which are based at least on a frequency-domain noise signal amplitude. The noise suppression gain function is limited to a maximal and a minimal value, to reduce artifacts caused by the noise suppression.

Figure 1:
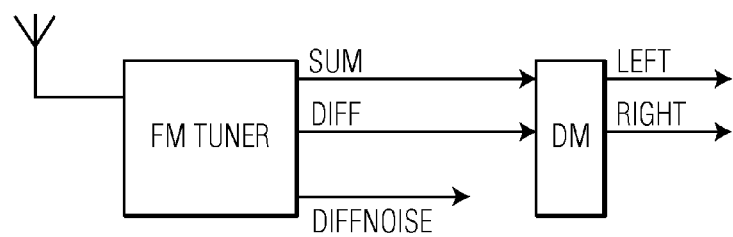
FIG. 1 shows the signals obtained during FM signal reception.
Figure 2A:
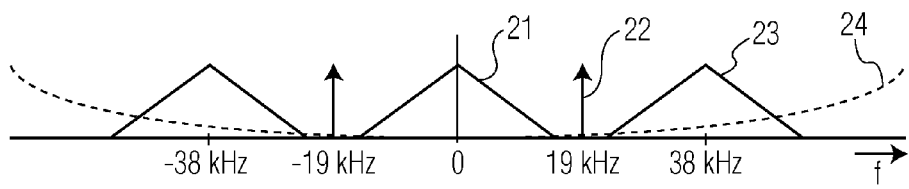
FIG. 2 (consisting of FIGS. 2A, 2B and 2C), shows how a noise estimate can be obtained.
Figure 2B:
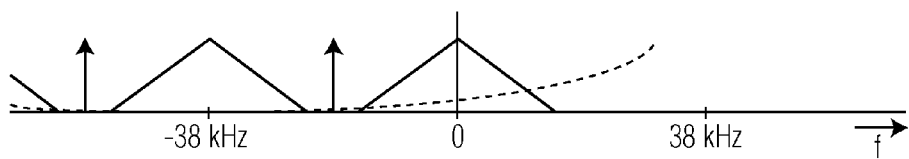
Figure 2C:
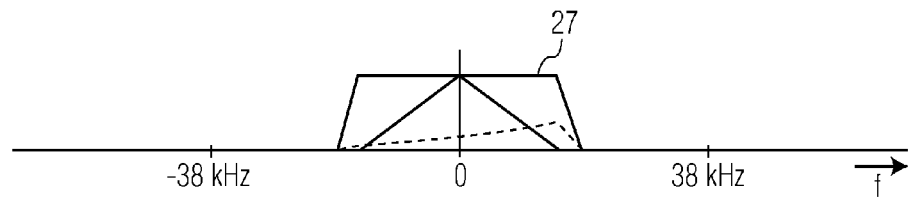
Figure 3:
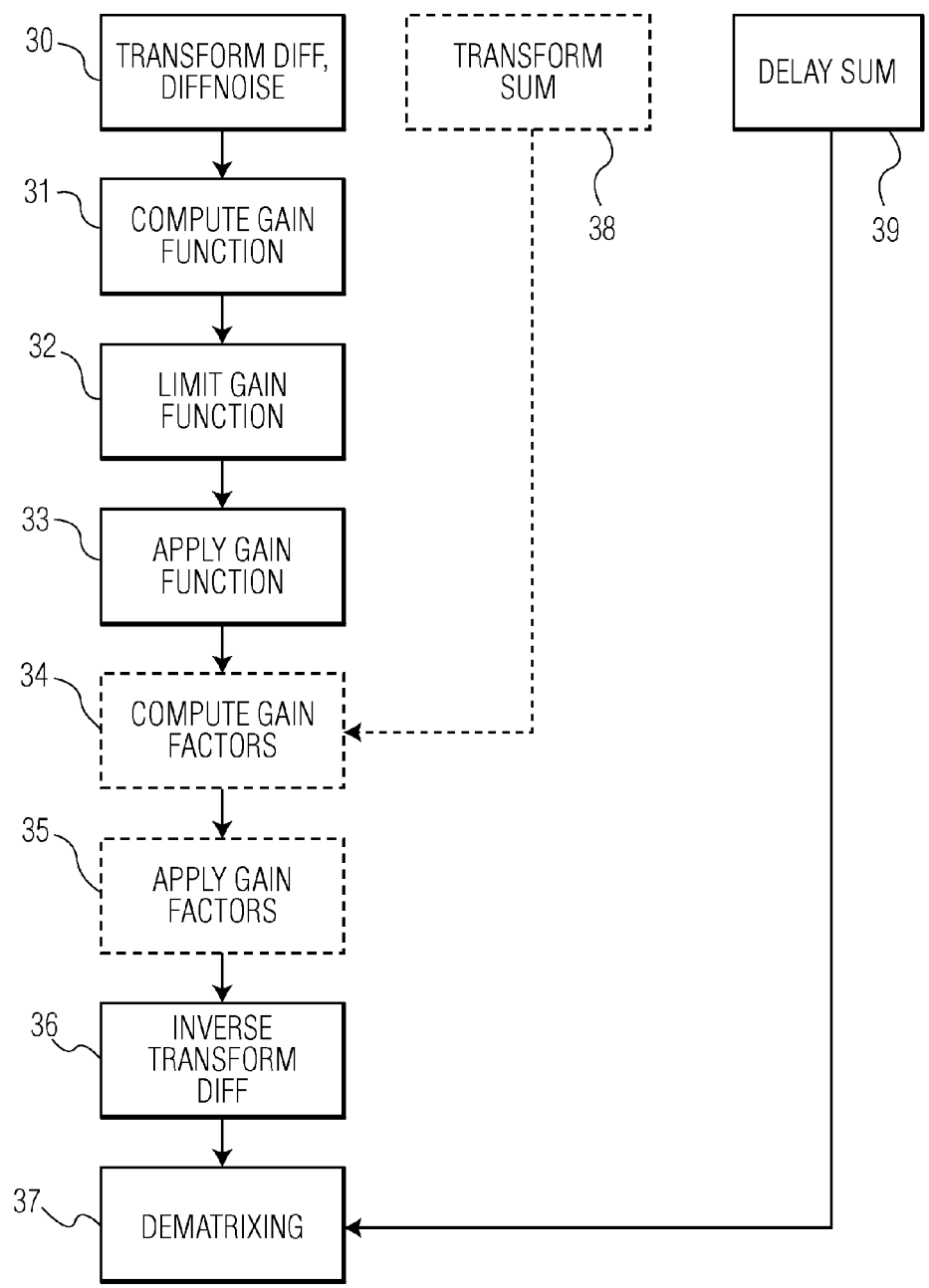
FIG. 3 is a flowchart showing the method of the invention.

FIG. 3 shows a flowchart of the invention, in which the optional components are represented by dashed lines. The process starts from the three time-domain signals: sum, diff and diffnoise (the outputs of the FM tuner, see FIG. 1).

The diff and diffnoise signals are transformed to the frequency domain in step 30. A gain function is computed in step 31 on the basis of the signal amplitudes and this gain function is limited to a maximal and a minimal value in step 32. The gain function is applied to the frequency-domain difference signal diff in step 33.

This gain function implements a limited noise suppression function in the frequency domain.

Additional (adaptive) gain factors (a single one or one per frequency) are computed in step 34 either on the basis of the residual noise level, or of the residual noise level in combination with the frequency-domain sum signal and these gain factors are also applied in step 35 to the difference signal. If a frequency-domain sum signal is used, there is a transformation step shown as 38 to convert from the time domain to the frequency domain.

Finally, the processed difference signal is inversely transformed to the time domain in step 36, and the stereo signal is computed from the delayed sum (the delay step shown as 39) and processed diff signal. This is the dematrixing operation shown as step 37.

Traditional frequency-domain noise suppression algorithms compute a gain function that is a function of the amplitude spectra of the original signal and of the (estimated) disturbance. In the current context, the original signal is the stereo difference signal (diff) and the disturbance is the diffnoise signal. This diffnoise signal is either available from the FM tuner or it can be estimated using techniques that are well known.

It is well known that the enhanced signal, i.e., the de-noised signal after noise suppression, may contain audible artifacts, such as musical noise, after processing with the traditional frequency-based techniques. Musical noise is an effect which is artificially produced by spectral subtraction, and manifests itself as a tin-like sound. Musical noise can be removed by post-processing but this adds further complexity to the processing.

To alleviate this problem, the amount of noise suppression can be limited to a fixed amount by imposing a minimal and/or a maximal value to the de-noising gain function. In this way, there may be some residual noise after noise suppression, but the artifacts are reduced.

In the context of FM stereo signals, the audio signal can be enhanced in several ways, assuming that the sum signal is less noisy than the difference signal:
apply noise suppression to the sum signal;
apply noise suppression to the difference signal;
attenuate the difference signal by a certain factor, such that the resulting left and right signals contain less of the difference signal, and thus, less of the noise present in the difference signal.

The first two possibilities do not alter the stereo image, but the third one does: by attenuating the difference signal, the stereo image will become less wide (it will tend more towards mono).

In the preferred example, the invention processes the difference signal using a combination of a traditional frequency-based noise suppression method (with gain limitation) and adaptive gain factors to further reduce the noise in the left and right audio channels if necessary.

Frequency-based noise suppression usually computes a gain function, $H_1(\omega)$ where $\omega$ denotes frequency, which is applied to the signal that needs to be enhanced. It is typically a function of the amplitude spectra of the input signal and of the disturbance. As an example, the following gain function can be used (for more details, reference is made to Loizou, 2007, chapter 5, "Speech Enhancement; Theory and Practice" 1st edition RCR press):

$$H_1(\omega) = \sqrt{\frac{|D(\omega)|^2 - \alpha|N(\omega)|^2}{|D(\omega)|^2}}, \quad (1)$$

where $|N(\omega)|$ and $|D(\omega)|$ are the magnitudes of respectively, the diffnoise and the diff signal at frequency $\omega$, and $\alpha$ is an over-subtraction factor.

This gain function has a gain of 1 or less (i.e. it provides attenuation) and the level of attenuation at each frequency is a function of the noise level at that frequency.

The gain function can be limited to a certain minimal value, $H_{min}(\omega)$, and a certain maximal value, $H_{max}(\omega)$, to reduce audible artifacts due to the noise suppression:

$$H_2(\omega) = \min\{\max\{H_1(\omega), H_{min}(\omega)\}, H_{max}(\omega)\} \quad (2)$$

The minimum and maximum values are functions of frequency, as shown.

This gain function may further be smoothed (both across time and across frequency), possibly using asymmetrical smoothing time constants for gain increases and decreases to further reduce artifacts. The enhanced (i.e. de-noised) difference signal is obtained by applying the gain to the original difference signal:

$$D1(\omega) = H_2(\omega)D(\omega) \quad (3)$$

Additional (frequency dependent) gain factors are applied to this de-noised difference signal:

$$D2(\omega) = \gamma(\omega)H_2(\omega)D(\omega) \quad (4)$$

where $\gamma(\omega)$ is the additional (adaptive) gain factor with respect to frequency.

When the gain is limited to a minimal value $H_{min}(\omega)$, the enhanced difference signal, will have a residual noise level, which can be estimated as:

$$N1(\omega) = N(\omega)(H_2(\omega) - H_1(\omega)) \quad (5)$$

Various different gain functions can be applied. These are developed in order to provide a good estimate of the enhanced signal, and the different types depend on the different assumptions and simplifications taken. Another often-used variant is the MMSE (minimal mean-square-error) gain function, which requires the a priori signal to noise ratio (SNR), the estimation method of which leads to different specific MMSE functions.

By imposing a maximal and/or minimal value on the de-noising gain function, the dynamic range of the gain function is limited. This way, a trade-off can be made between the amount of noise suppression and the level of (possibly audible) artifacts, since many artifacts are caused by large abrupt changes in the gain function. Keeping Hmax at unity, Hmin can be increased from 0 to unity, corresponding to solutions with maximal noise suppression and most risk of audible artifacts (Hmin=0) to solutions with no noise suppression and no artifacts (Hmin=1). A similar reasoning holds for Hmax. These values can therefore be set according to the desired result.

Figure 4:
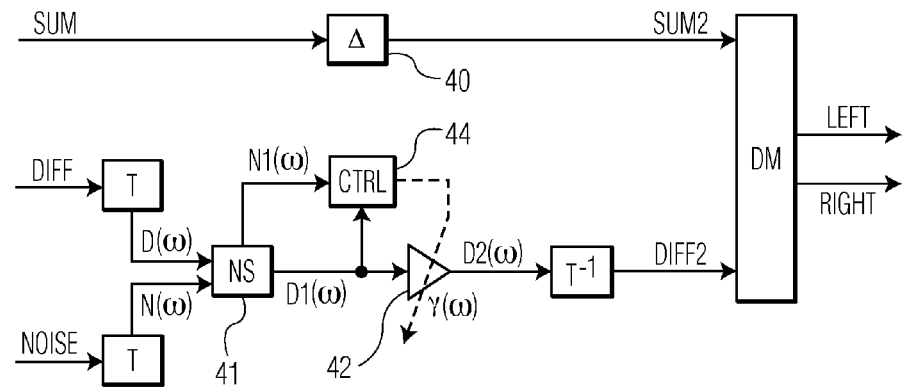
FIG. 4 is a first example of receiver of the invention.

A first embodiment is shown in FIG. 4. The system has three inputs, namely the sum signal, the diff signal and the diffnoise signal. The sum signal is delayed by a delay element 40. The modules labeled "T" and "$T^{-1}$" denote a frequency transform and its inverse. This can be an FFT and inverse FFT (including windowing and overlap-add techniques), but also filter bank type of transforms, such as quadrature mirror filter banks (QMF) or others.

The noise suppression module 41 (NS) computes a gain function and applies it to the frequency-domain difference signal $D(\omega)$. The output of the module 41, $D1(\omega)$, is multiplied by a gain factor, $\gamma(\omega)$, yielding $D2(\omega)$, after which the inverse transform is computed.

The output of the noise suppression module can be considered to be a frequency-domain de-noised difference signal $D1(\omega)$. The output after the adaptive gain element 42 can be considered as a processed frequency-domain difference signal $D2(\omega)$. After the inverse transform, a processed time domain difference signal "diff2" results.

The left and right signals are obtained in the dematrixing module "DM" from the delayed sum signal, sum2, and the output signal of the inverse transform unit, diff2.

The gain factors, $\gamma(\omega)$, are controlled by a control module 44 (ctrl) which adapts the gain factors in such a way that the expected noise level in the difference signal, e.g., estimated using $N(\omega)$ (Eq. (4)), complies to a certain criterion. This criterion can be based on the ratio of the expected peak value of the original difference signal and the residual noise level in the enhanced difference signal (per frequency bin), or it can be based on a perceptually motivated criterion, e.g., using perceptual masking thresholds or partial loudness.

Setting a predefined peak-to-residual-noise-level to a low value may be too strict in many cases: the residual noise may be masked by signal power in neighbouring frequency regions. This masking effect is taken into account when a predefined signal-to-mask ratio is used as criterion, which is the ratio between residual noise and the perceptual masking threshold (a 0 dB ratio corresponds to the limit at which the noise is inaudible). Partial loudness can be used to predict the perceived loudness of the residual noise in the presence of other sources (the broadcast, but also, e.g., ambient noise).

The adaptation of the gain factors should be slow (for example time constants between 100 ms and several seconds) so as not to generate audible artifacts.

Figure 5:
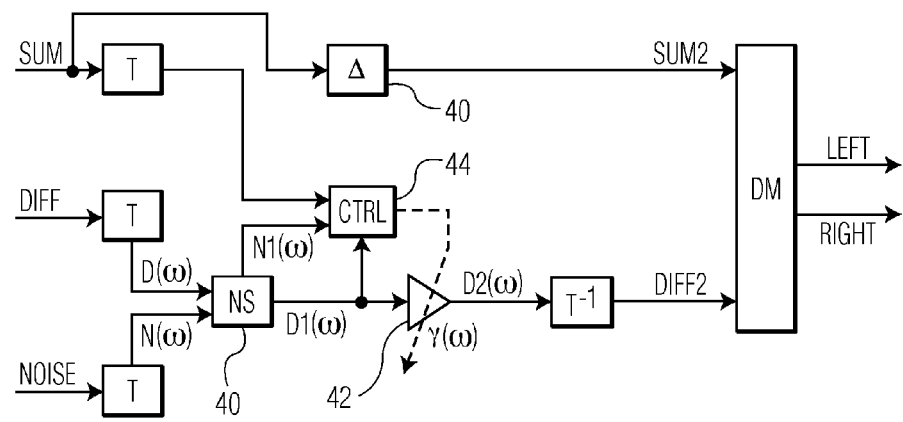
FIG. 5 is a second example of receiver of the invention.

A second embodiment is shown in FIG. 5. The sum signal sum is also transformed to the frequency domain, and it constitutes an additional input to the control module 44. The gain factors are now adapted in such a way that the expected signal-to-noise ratio in the left and right audio channel complies to a certain criterion, as well as or instead of the difference signal as in the first embodiment.

This criterion can be based on the ratio of the expected peak value in the left audio, right audio or sum signal, and the noise level in the de-noised difference signal (e.g., computed on the basis of $N(\omega)$), or it can be based on a perceptually motivated criterion, e.g., using perceptual masking thresholds or partial loudness.

The second embodiment provides a control mechanism that better reflects the final stereo signal. Indeed, a criterion based on the left and right output signals is used, rather than only of the output difference signal. Artifacts or residual noise that are audible in the output difference signal are not necessarily audible after dematrixing, since they can be masked by the sum signal.

The invention can be implemented as a software module that processes an FM stereo signal. Thus, the invention also relates to computer software that can be run by a processor forming part of an FM receiver.

The input signals are the sum signal ('sum'), the difference signal ('diff') and a noise signal that has similar signal characteristics as the noise component in the difference signal (diffnoise). The module requires the following components:
- a frequency transform.
- a frequency-domain noise suppression module that enhances the difference signal.
- an adaptive gain unit that attenuates the frequency-domain enhanced difference signal.
- a de-mixing matrix to generate the left and right audio signal from the sum signal and the enhanced difference signal.

The invention can be part of an FM stereo tuner. It can be implemented as a software module to improve signal quality when the FM reception quality deteriorates.

The preferred implementation of the invention combines frequency domain de-noising with adaptive gain factors applied to the difference signal. However, advantages are obtained when only the frequency-domain de-noising is applied to the difference signal, and the additional use of adaptive gain factors is therefore preferred but optional.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A processing unit for processing a multi-channel audio signal, comprising:
    a delay element configured to delay an FM sum signal representing a sum of a first and a second audio signal;
    a converter configured to convert an FM difference signal representing a difference between the first and second audio signals to frequency domain, and configured to convert a noise signal representing noise in the FM difference signal to the frequency domain;
    a frequency-based noise suppression unit configured to suppress noise in the difference signal to derive a de-noised frequency-domain difference signal based on a gain function based at least on an amplitude of the frequency-domain noise signal, wherein the gain function is limited to a maximal and a minimal value;
    an inverse transform unit configured to inversely transform the de-noised frequency-domain difference signal or a signal derived from the de-noised frequency-domain difference signal to time domain; and
    a de-matrixing unit configured to compute the first and second audio signals from the delayed FM sum signal and time domain difference signal; and
    further comprising a gain unit configured to apply additional gain factors to the de-noised frequency-domain difference signal to derive a processed frequency-domain difference signal, wherein the inverse transform unit is configured to inversely transform the processed frequency-domain difference signal.

2. A processing unit as claimed in claim 1, further comprising a controller configured to control the gain unit.

3. A processing unit as claimed in claim 2, wherein the additional gain factors are based on a residual noise level.

4. A processing unit as claimed in claim 2, wherein the converter arrangement is configured to convert the sum signal to the frequency domain, and wherein the additional gain factors are based on a residual noise level in combination with the frequency-domain sum signal.

5. A processing unit as claimed in claim 4, wherein the gain function and the additional gain factors are controlled such that an expected signal-to-noise ratio in the first and second audio signals meet predefined criteria.

6. A processing unit as claimed in claim 5, wherein the criteria are based on a ratio of the expected peak value in the first audio signal, the second audio signal or the sum signal, and the noise level in the processed time-domain or frequency-domain difference signal.

7. A receiver comprising an FM tuner and a processing unit as claimed in claim 1.

8. A method of processing a multi-channel audio signal, comprising:
    delaying an FM sum signal representing a sum of a first and a second audio signal;
    converting an FM difference signal representing a difference between the first and second audio signals to a frequency domain, and converting a noise signal representing noise in the FM difference signal to the frequency domain;
    suppressing noise in the frequency-domain difference signal using a frequency-based noise suppression unit to derive a de-noised difference signal based on a gain function based on at least the frequency-domain noise signal amplitude, wherein the gain function is limited to a maximal and a minimal value;

inversely transforming the de-noised frequency-domain difference signal or a signal derived from the de-noised frequency-domain difference signal to the time domain; and computing the first and second audio signals from the delayed sum signal and time domain difference signal; and further comprising applying additional gain factors to the de-noised frequency-domain difference signal to derive a processed frequency-domain difference signal, wherein the inverse transforming is applied to the processed frequency-domain difference signal.

9. A method as claimed in claim 8, wherein the additional gain factors are based on a residual noise level.

10. A method as claimed in claim 8, further comprising converting the sum signal to the frequency domain, and the additional gain factors are based on a residual noise level in combination with the frequency-domain sum signal.

11. A method as claimed in claim 10, wherein the gain function and the additional gain factors are controlled such that the expected signal-to-noise ratio in the first and second audio signals meet predefined criteria.

12. A method as claimed in claim 11, wherein the criteria are based on the ratio of the expected peak value in the first audio signal, the second audio signal or the sum signal, and the noise level in the processed frequency-domain or time-domain difference signal.

13. A non-transitory computer-readable storage medium containing a program configured to implement the method of claim 8, when said program is run on a computer.

* * * * *